(12) United States Patent
Verma

(10) Patent No.: US 7,400,620 B1
(45) Date of Patent: Jul. 15, 2008

(54) METHOD AND APPARATUS FOR HANDLING SMALL PACKETS

(75) Inventor: Vatan Kumar Verma, Betul Bazar (IN)

(73) Assignee: Cypress Semiconductor Corporation, San Jose, CA (US)

( * ) Notice: Subject to any disclaimer, the term of this patent is extended or adjusted under 35 U.S.C. 154(b) by 1220 days.

(21) Appl. No.: 10/325,415

(22) Filed: Dec. 19, 2002

(51) Int. Cl.
- H04L 12/28 (2006.01)
- H04L 12/58 (2006.01)
- H04J 3/24 (2006.01)
- G06F 15/16 (2006.01)

(52) U.S. Cl. .............. 370/389; 370/392; 370/428; 370/473; 370/474; 709/231; 710/52

(58) Field of Classification Search .......... None
See application file for complete search history.

(56) References Cited

U.S. PATENT DOCUMENTS

| | | |
|---|---|---|
| 4,433,378 A | 2/1984 | Leger |
| 4,841,526 A | 6/1989 | Wilson et al. |
| 4,920,483 A | 4/1990 | Pogue et al. |
| 4,965,794 A | 10/1990 | Smith |
| 5,079,693 A | 1/1992 | Miller |
| 5,182,651 A | 1/1993 | Kishi |
| 5,291,586 A | 3/1994 | Jen et al. |
| 5,319,648 A | 6/1994 | Bux et al. |
| 5,386,412 A | 1/1995 | Park et al. |
| 5,471,628 A | 11/1995 | Phillips et al. |
| 5,825,770 A | 10/1998 | Coady et al. |
| 5,844,923 A | 12/1998 | Condon |
| 5,920,572 A * | 7/1999 | Washington et al. ........ 370/535 |
| 5,930,830 A | 7/1999 | Mendelson et al. |
| 5,964,835 A | 10/1999 | Fowler et al. |
| 6,347,097 B1 | 2/2002 | Deng |
| 6,359,911 B1 * | 3/2002 | Movshovich et al. ........ 370/536 |
| 6,442,669 B2 | 8/2002 | Wright et al. |
| 6,584,584 B1 | 6/2003 | Smith |
| 6,640,297 B1 | 10/2003 | Banning et al. |
| 6,714,543 B1 | 3/2004 | Brueckheimer et al. |
| 6,763,390 B1 * | 7/2004 | Kovacevic et al. ........... 709/231 |
| 6,957,309 B1 | 10/2005 | Gupta et al. |
| 6,961,348 B2 * | 11/2005 | Yu .............................. 370/466 |
| 7,035,335 B1 * | 4/2006 | Iacobelli et al. ......... 375/240.25 |
| 7,061,930 B2 * | 6/2006 | Mizobata ..................... 370/429 |

(Continued)

OTHER PUBLICATIONS

Nilam Ruparelia, *Delivering Ethernet Over Sonet Using Virtual Concatenation*, CommsDesign, Feb. 25, 2002, 8 pages, www.commsdesign.com/story/OEG20020225S0078.

(Continued)

*Primary Examiner*—Melanie Jagannathan
(74) *Attorney, Agent, or Firm*—Blakely, Sokoloff, Taylor & Zafman LLP (57) ABSTRACT

In one embodiment, the invention is an apparatus. The apparatus includes comparison logic to compare received data values to an expected data value, producing a first result. The apparatus also includes combinatorial logic coupled to the comparison logic. The combinatorial logic is to use the first result to encode in a second result which path of a set of paths the received data should traverse. The apparatus also includes transfer logic coupled to the combinatorial logic. The transfer logic is to transfer the received data values to each of three paths using the second result.

20 Claims, 8 Drawing Sheets

U.S. PATENT DOCUMENTS

| | | | |
|---|---|---|---|
| 7,088,732 B2 * | 8/2006 | Min | 370/428 |
| 2001/0049726 A1 | 12/2001 | Comeau et al. | |
| 2002/0009100 A1 | 1/2002 | Raghavan et al. | |
| 2004/0064589 A1 | 4/2004 | Boucher et al. | |
| 2004/0117584 A1 | 6/2004 | Banerjee et al. | |
| 2004/0196847 A1 | 10/2004 | Kuwabara | |

OTHER PUBLICATIONS

Louis E. Frenzel, *Programmable Framer Chip Improves OC-48 Efficiency*, Electronic Design, Apr. 16, 2001, 4 pages.

Michael Timothy Moore, *Filling the WAN-Communications-Line Card*, designfeature, Apr. 18, 2002, 5 pages, www.ednmag.com.

Finney et al., "Using a Common Barrel Shifter for operand normalization, operand alignment and operand unpack & pack in floating point", IBM TDB vol. 29, No. 2, Jul. 1986.

Eddie Kohler, Robert Morris, Benjie Chen, "Programming Language Optimizations For Modular Router Configurations" ACM SIGOPS Operating Systems Review, vol. 36, 30, 37, Issue, 5, 5, 10, Oct. 2002.

Imrich Chlamtac et al., "Scalable WDM Access Network Architecture Based On Photonic Slot Routing" IEEE/ACM Transactions on Networking (TON), vol. 7, Issue 1, pp. 1-9, Feb. 1999.

* cited by examiner

METHOD AND APPARATUS FOR HANDLING SMALL PACKETS

FIELD

The invention relates generally to communications hardware and related methods, and more specifically to methods and apparatuses for handling small-length packets in a communications system designed for long packets.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include reorganizing data from a series of packets into a format useful to a processor. In particular, this may include taking data bits of a series of bytes and reorganizing them into a form including only data bits. A similar problem may occur at a byte-level, wherein some bytes of a group of bytes are data bytes, and other bytes are effectively control bytes which need to be parsed out of data. Moreover, some control data may be provided in very small packets (as few as 3 bytes), whereas many systems are predicated on a minimum packet length on the order of 8-10 bytes.

Figure 1:
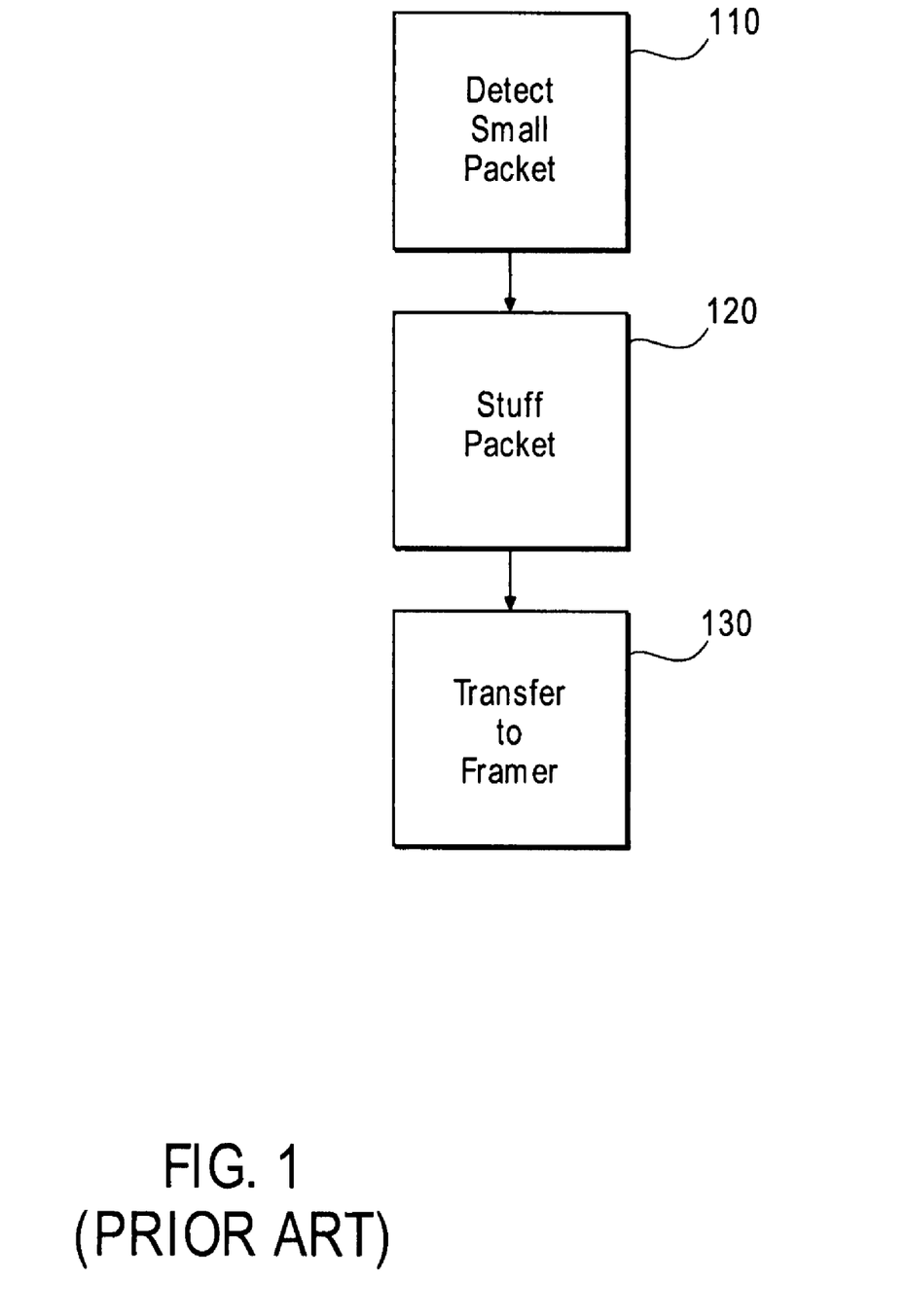
FIG. 1 illustrates an embodiment of a conventional method of handling a small packet in flow diagram form.

In some embodiments, it is common to handle small packets in a physical link layer, by stuffing those packets with extra bytes to create a minimum-length packet. For example, a minimum length may be set to 9 or 10 bytes, and any packets detected with a shorter length may be padded with extra bytes to achieve this minimum length. Referring to FIG. 1, an embodiment of a conventional method of handling a small packet in flow diagram form is illustrated. At block 110, the small packet is detected in the physical link layer. At block 120, the small packet is stuffed with extra bytes to achieve a minimum length of the packet for purposes of future processing. At block 130, the small packet as stuffed is then transferred to the associated framer component for further processing.

This adds complexity to the physical link layer, and requires processing to discard the extra bytes of padding later in the process of utilizing these packets. Effectively, this is creating extra work and extra complexity for the purpose of simplifying some of the associated circuitry. Whether the extra bytes are stripped in the framer or in a later stage of the processing circuitry, they will not be used by the end system and carry no useful information.

SUMMARY

In one embodiment, the invention is a method. The method includes comparing bytes with an expected value. The method also includes steering data to a first path based on a first result of the comparing. The method further includes steering data to an other path based on a second result of the comparing.

In an alternate embodiment, the invention is an apparatus. The apparatus includes comparison logic to compare received data values to an expected data value, producing a first result. The apparatus also includes combinatorial logic coupled to the comparison logic. The combinatorial logic is to use the first result to encode in a second result which path of a set of paths the received data should traverse. The apparatus also includes transfer logic coupled to the combinatorial logic. The transfer logic is to transfer the received data values to each of three paths using the second result.

In another alternate embodiment, the invention is an apparatus. The apparatus includes means for comparing data bytes with an expected value. The apparatus also includes means for steering data bytes to a first path based on a first result of the means for comparing. The apparatus further includes means for steering data bytes to an other path based on a second result of the means for comparing.

BRIEF DESCRIPTION OF THE DRAWINGS

The present invention is illustrated by way of example and not limitation in the accompanying figures.

DETAILED DESCRIPTION

A method and apparatus for handling small packets is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In general, the invention relates to a method or apparatus for recognizing and categorizing a small packet. The small packet is then steered based on the categorization into one of several paths for additional processing. Each path allows for processing of an incoming packet, but the separate paths allow for independent processing without interference from otherwise uninvolved data. Similarly, as the paths receive only bytes in the packet to be processed from that path, no data need be specially transferred between paths or backed out of a path to complete processing of a packet in a separate path. The paths are rotated, such that each is used in succession for the next packet received. Furthermore, as the packets may be recognized even though they are shorter than the accepted minimum width, the method or apparatus effectively handles the small packets without requiring a redesign of other well-known portions of the system. Note that it is understood in the following description that a packet which occupies the entire incoming dataspace (all eight bytes in one embodiment), will simply occupy a single path and will not require any special handling.

In one embodiment, the invention is a method. The method includes comparing bytes with an expected value. The method also includes steering data to a first path based on a first result of the comparing. The method further includes steering data to an other path based on a second result of the comparing.

In an alternate embodiment, the invention is an apparatus. The apparatus includes comparison logic to compare received data values to an expected data value, producing a first result. The apparatus also includes combinatorial logic coupled to the comparison logic. The combinatorial logic is to use the first result to encode in a second result which path of a set of paths the received data should traverse. The apparatus also includes transfer logic coupled to the combinatorial logic. The transfer logic is to transfer the received data values to each of three paths using the second result.

In another alternate embodiment, the invention is an apparatus. The apparatus includes means for comparing data bytes with an expected value. The apparatus also includes means for steering data bytes to a first path based on a first result of the means for comparing. The apparatus further includes means for steering data bytes to an other path based on a second result of the means for comparing.

Figure 2:
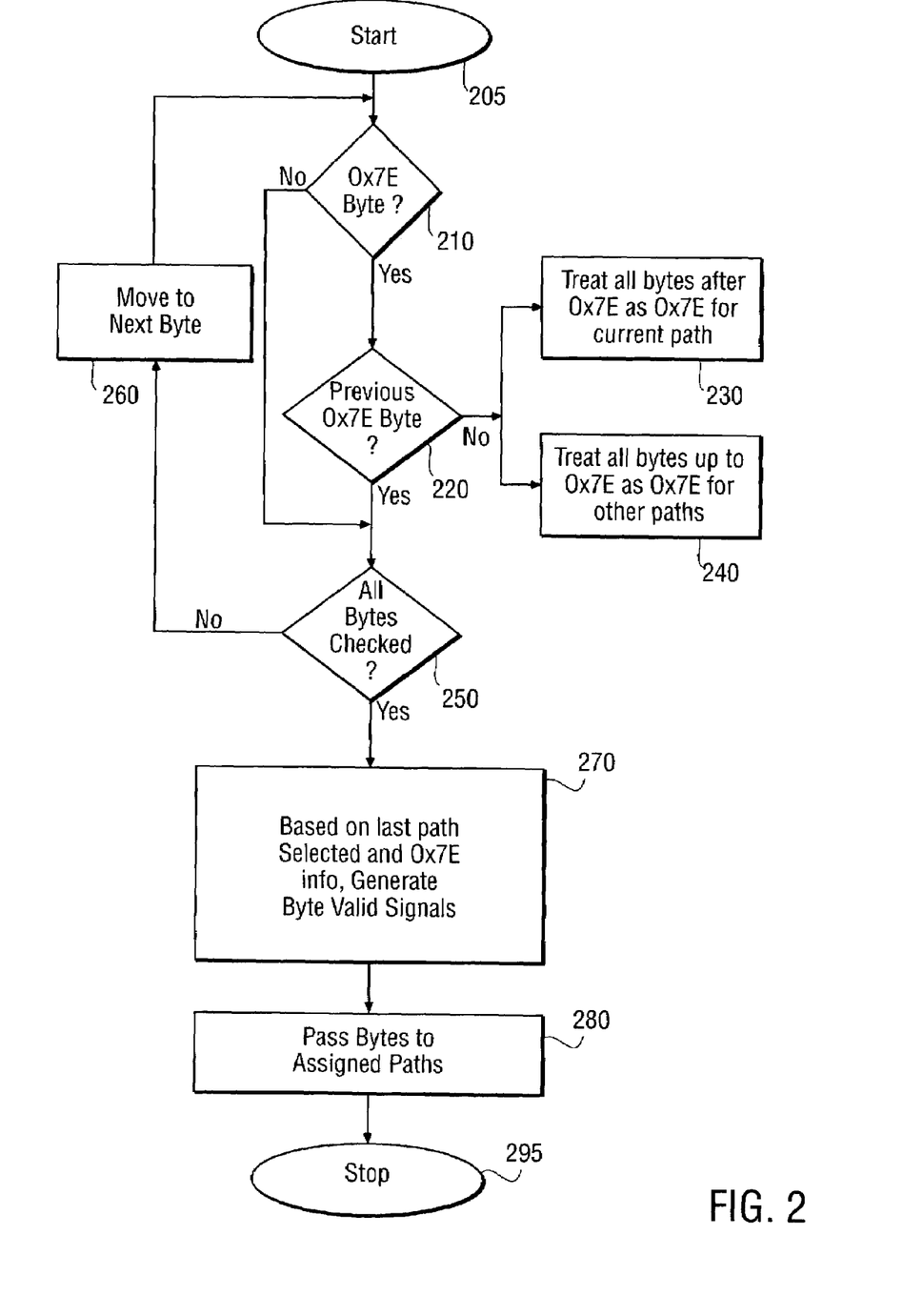
FIG. 2 illustrates an embodiment of a method of handling a small packet in flow diagram form.

FIG. 2 illustrates an embodiment of a method of handling a small packet in flow diagram form. At block 205, the process is initiated by receipt of a set of bytes. In one embodiment, eight bytes are received at a time. At block 210, a determination is made as to whether the first (present) byte has the value 0x7E (126 decimal, or 01111110 binary), which signifies the beginning/end of a packet. If yes, then a determination is made at block 220 as to whether the previous byte also had a value of 0x7E. If not, then at block 230 all bytes following the present byte are treated as 0x7E (and thus not subject to inclusion) for this packet, and at block 240, all bytes prior to the present byte are treated as 0x7E (and thus not subject to inclusion) for the next packet.

If either no 0x7E bytes or a string of 0x7E bytes are encountered, then at block 250, a determination is made as to whether all bytes received have been checked. If not, at block 260, the process makes the next byte the present byte, and returns to block 210. If so, then at block 270, based on the last path selected (as stored in status memory) and the 0x7E information from blocks 210-240, byte valid signals for the various paths are generated. At block 280, the bytes are then passed to the assigned paths (based on the byte valid signals), and the process terminates for the current set of bytes.

Figure 3:
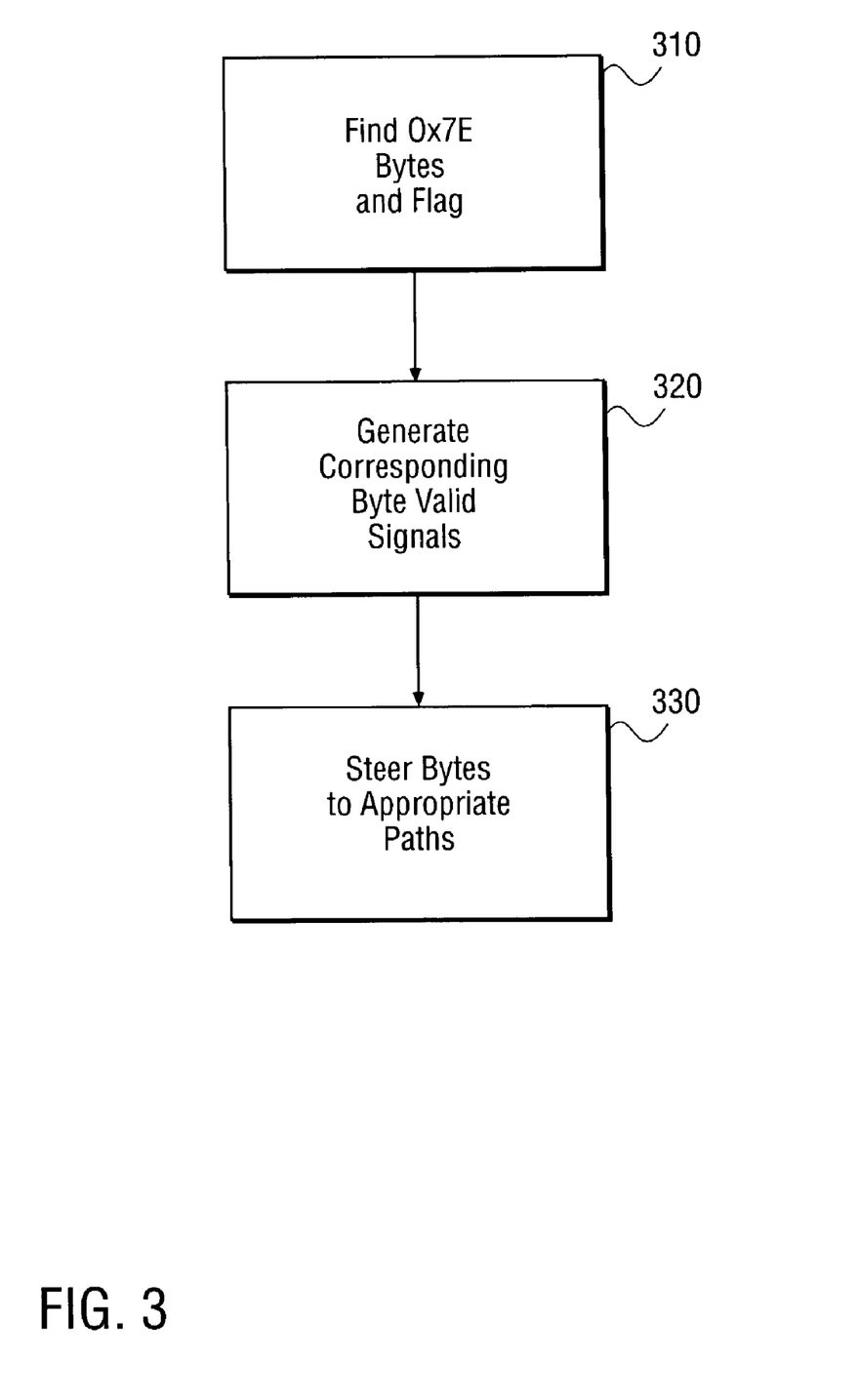
FIG. 3 illustrates an alternate embodiment of a method of handling a small packet in flow diagram form.

A similar but more general description may be found in succeeding figures. FIG. 3 illustrates an alternate embodiment of a method of handling a small packet in flow diagram form. At block 310, the 0x7E bytes (or other packet boundary signifiers) are found. At block 320, the corresponding byte valid signals for the various paths are generated. At block 330, the bytes are steered to the various paths based on the byte valid signals. Thus, the process is find the boundaries, determine path selections based on those boundaries, and steer data along those paths as selected.

Figure 4A:
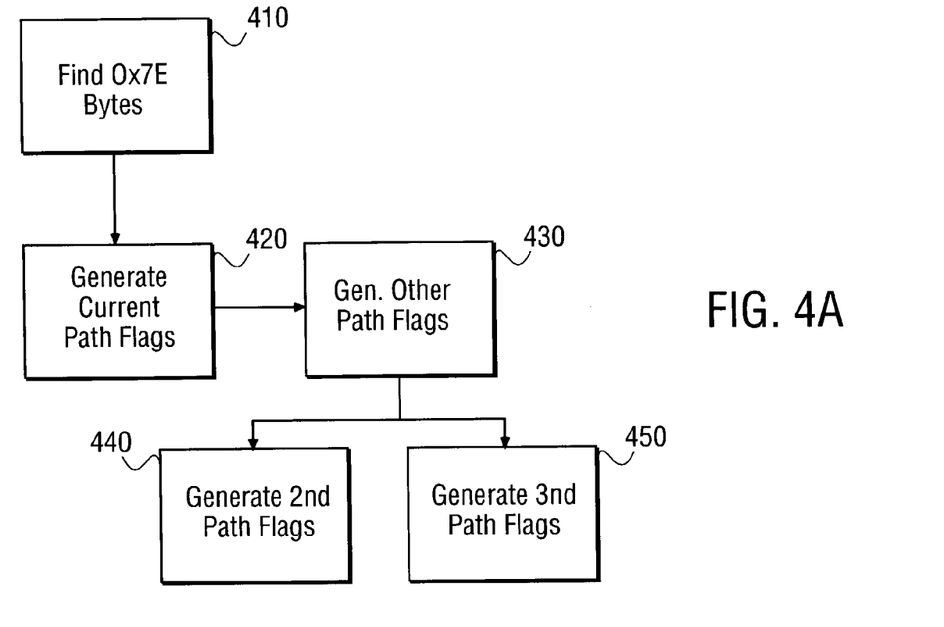
FIG. 4A illustrates an embodiment of a method of classifying small packets in flow diagram form.

For the particular case of three paths using 0x7E as the boundary, the process of finding and determining paths may be accomplished as in FIG. 4A. FIG. 4A illustrates an embodiment of a method of classifying small packets in flow diagram form. At block 410, the 0x7E bytes are found. At block 420, flags for the current path are generated. At block 430, flags for the other paths are generated. At block 440, the flags for the other paths are used to generate flags for the second path. Similarly, at block 450, the flags for the other paths are used to generate flags for the third path. Thus, using the boundaries found in block 410, flags are generated indicating which bytes should follow each of the three paths.

Figure 4B:
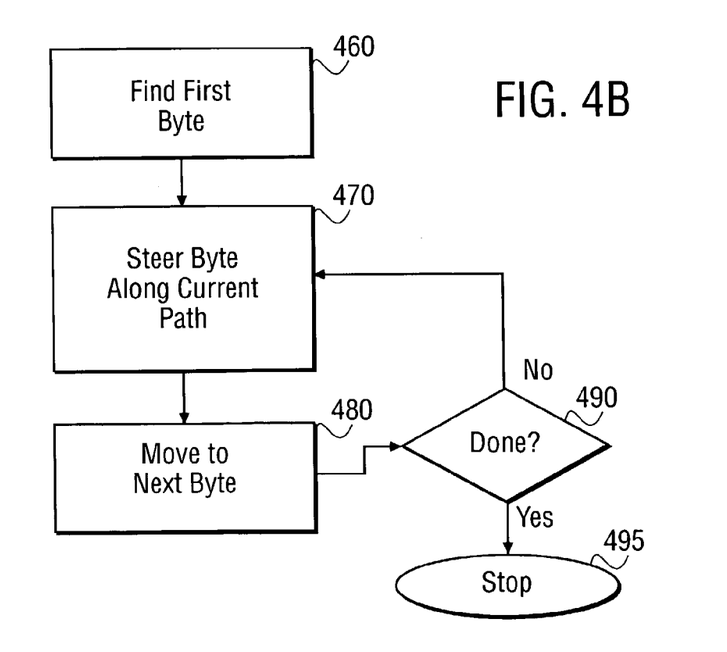
FIG. 4B illustrates an embodiment of a method of steering small packets in flow diagram form.

Once the paths have been chosen, they must then be used. FIG. 4B illustrates an embodiment of a method of steering small packets in flow diagram form. At block 460, the first byte is found. At block 470, the first byte is steered along the current path. At block 480, the next byte is found. At block 490, it is determined whether the next (now current) byte should go along the current path or whether the current path should be shifted to the next path, based on the flags generated in the process of FIG. 4A. Once either the old current path has been retained or the new current path has been selected, the process returns to block 470, so the now current byte may be steered appropriately. If all of the bytes have been steered, the process terminates at block 495.

Figure 5:
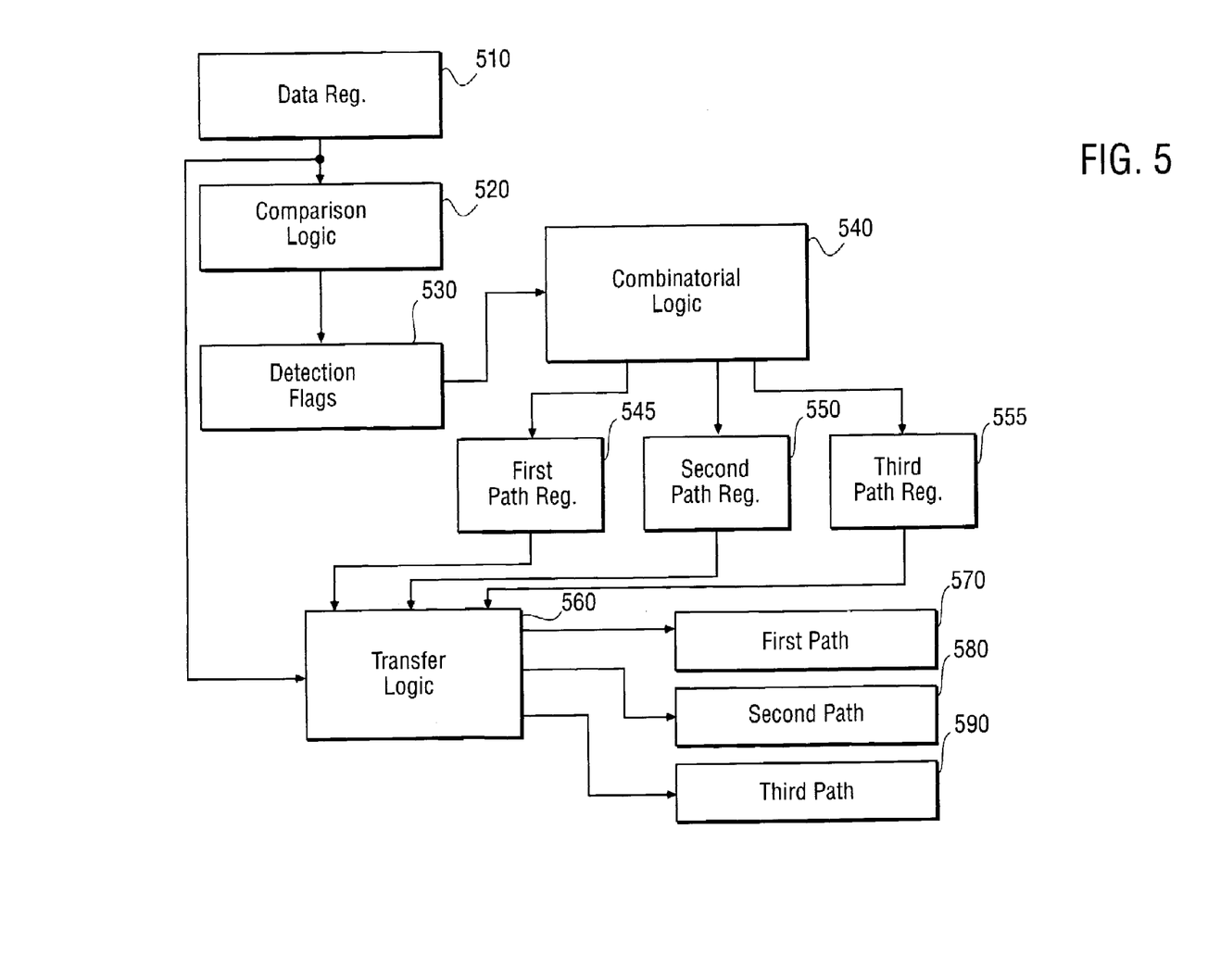
FIG. 5 illustrates an embodiment of an apparatus for handling small packets in block diagram form.

FIG. 5 illustrates an embodiment of an apparatus for handling small packets in block diagram form. This apparatus may be used in a manner similar to the method illustrated in FIGS. 4A and 4B for example. In general, the embodiment may be divided into three computational areas (comparison logic, combinatorial logic and transfer logic) and supporting memory/storage. The comparison logic determines where frame transitions occur. The combinatorial logic determines which paths should be used based on the results of the comparison. The transfer logic transfers data to the appropriate paths as determined by the combinatorial logic.

Data register 510 receives data to be examined. In one embodiment, data register 510 holds eight (8) bytes of data. Comparison logic 520 compares the contents of the data register 510 to a predetermined value or set of values, for the purpose of finding packet transitions within the data. Detection flags 530 are a set of storage locations (such as a set of flags or a register for example), which are coupled to comparison logic 520 and may be used to hold the result of the comparison performed by comparison logic 520.

Combinatorial logic 540 is coupled to detection flags 530 and uses the data of detection flags 530 (results from comparison logic 520) to determine which of three paths should receive all or part of the data of data register 510. In general, combinatorial logic 540 is preferably implemented to direct all or a first portion of the data of data register 510 to a first path, a second portion or the rest of data of data register 530 to a second path, and any remaining data of data register 530 to a third path. Thus, the data may be directed to one or more of the three paths based on the results of comparison logic 520. The directions are encoded in first path register 545, second path register 550 and third path register 555, each of which are coupled to combinatorial logic 540.

Also coupled to registers 545, 550 and 555 is transfer logic 560. Transfer logic 560 is also coupled to data register 510, and to each of three paths, first path 570, second path 580 and third path 590. Transfer logic 560 uses the contents of registers 545, 550 and 555 to determine which of the paths 570, 580 and 590 should receive each byte (or other unit) of data register 510. In one embodiment, transfer logic 560 maintains state which indicates which of the three paths 570, 580 and 590 was last used or should be used next, thus allowing for rotation of the three paths as the first, second and third paths, and likewise allowing for more optimal utilization of the resources of the three paths.

Figure 6:
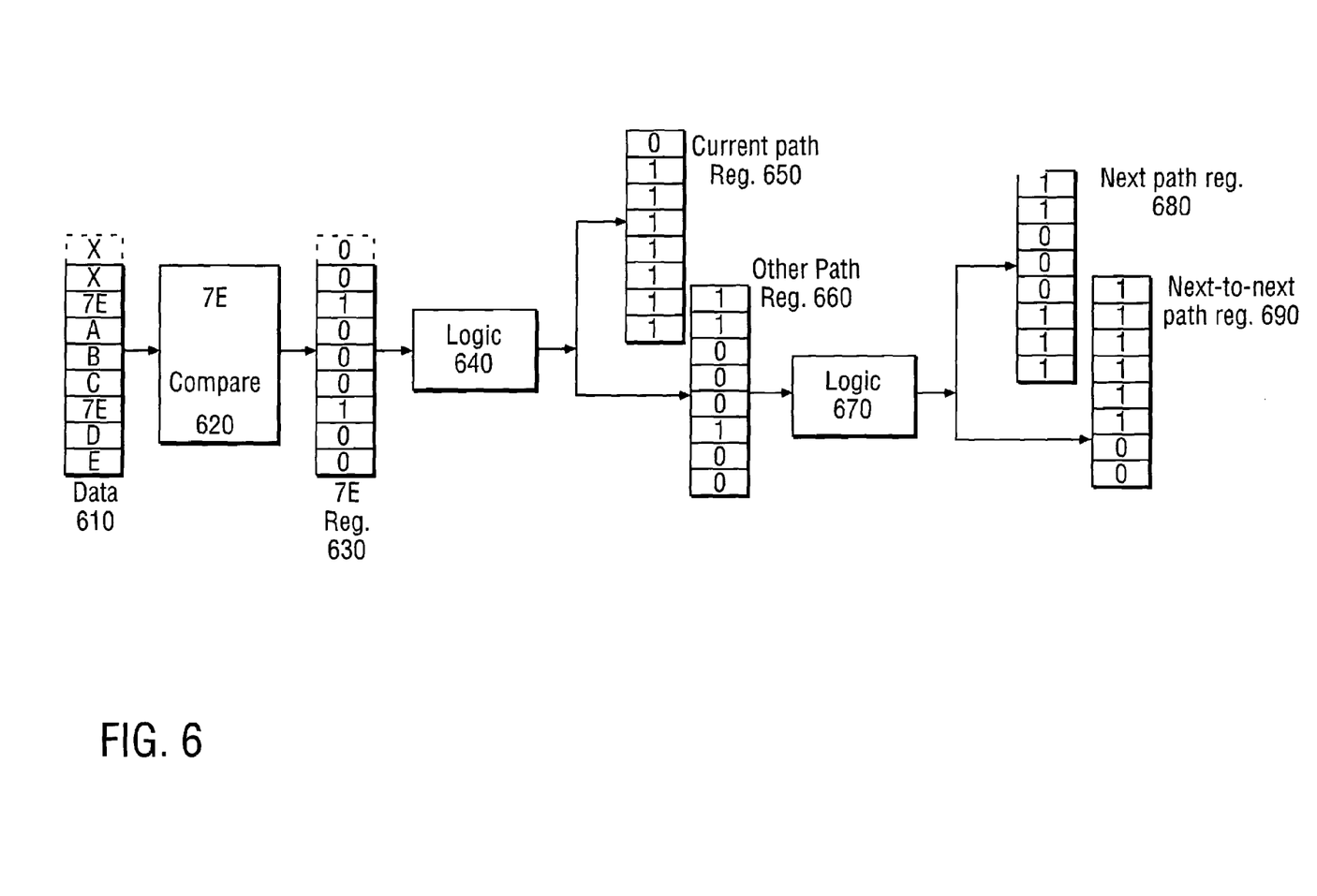
FIG. 6 illustrates an embodiment of an apparatus for classifying small packets in block diagram form.

A particular embodiment may be implemented using a series of logic and registers. FIG. 6 illustrates an embodiment of an apparatus for classifying small packets in block diagram form. Data register 610 includes storage locations for eight bytes, and has associated with it a register to maintain the last byte of the previous set of eight bytes (thus allowing for comparisons to the byte preceding the current set of eight bytes. 7E compare logic 620 is designed to compare each of the eight bytes of data register 610 to the value 0x7E, with the results stored as a one bit value in 7E register 630.

Logic 640 is coupled to 7E register 630 and searches the contents of 7E register 630 for the first instance of a true result of the comparison of 7E compare logic 620. Based on finding that first instance, current path register 650 (for the current first data path) is set with a '0' for all bits prior to the first instance and with a '1' for all bits including and succeeding the first instance, thus signifying that the bits corresponding to '0' entries should be directed to the current path. Similarly, other path register 660 is set with a '1' for the bits corresponding to the first instance and preceding bits, and is also set with a '1' for any other instances of a '1' following the first instance in the 7E register 630 (thus preserving a second instance to determine separation between a second and third path).

Logic 670 is coupled to other path register 660 and searches the contents of other path register 660 for the second instance of a true result of the comparison of 7E compare logic 620. Based on finding that second instance, next path register 680 (for the current second data path) is set with a '0' for all bits after the first instance but prior to the second instance, with a '1' for all bits prior to and including the first instance, and with a '1' for all bits including and succeeding the second instance, thus signifying that the bits corresponding to '0' entries should be directed to the next path. Similarly, next-to-next path register 690 is set with a '1' for the bits corresponding to the second instance, and has contents of other path register 660 copied for any bits either preceding or following the second instance in the 7E register 630. Thus, the '0' bits of each register signify which data bytes should be transferred to which path, and the 0x7E values are eliminated, having served the purpose of delimiting the packets.

Figure 7:
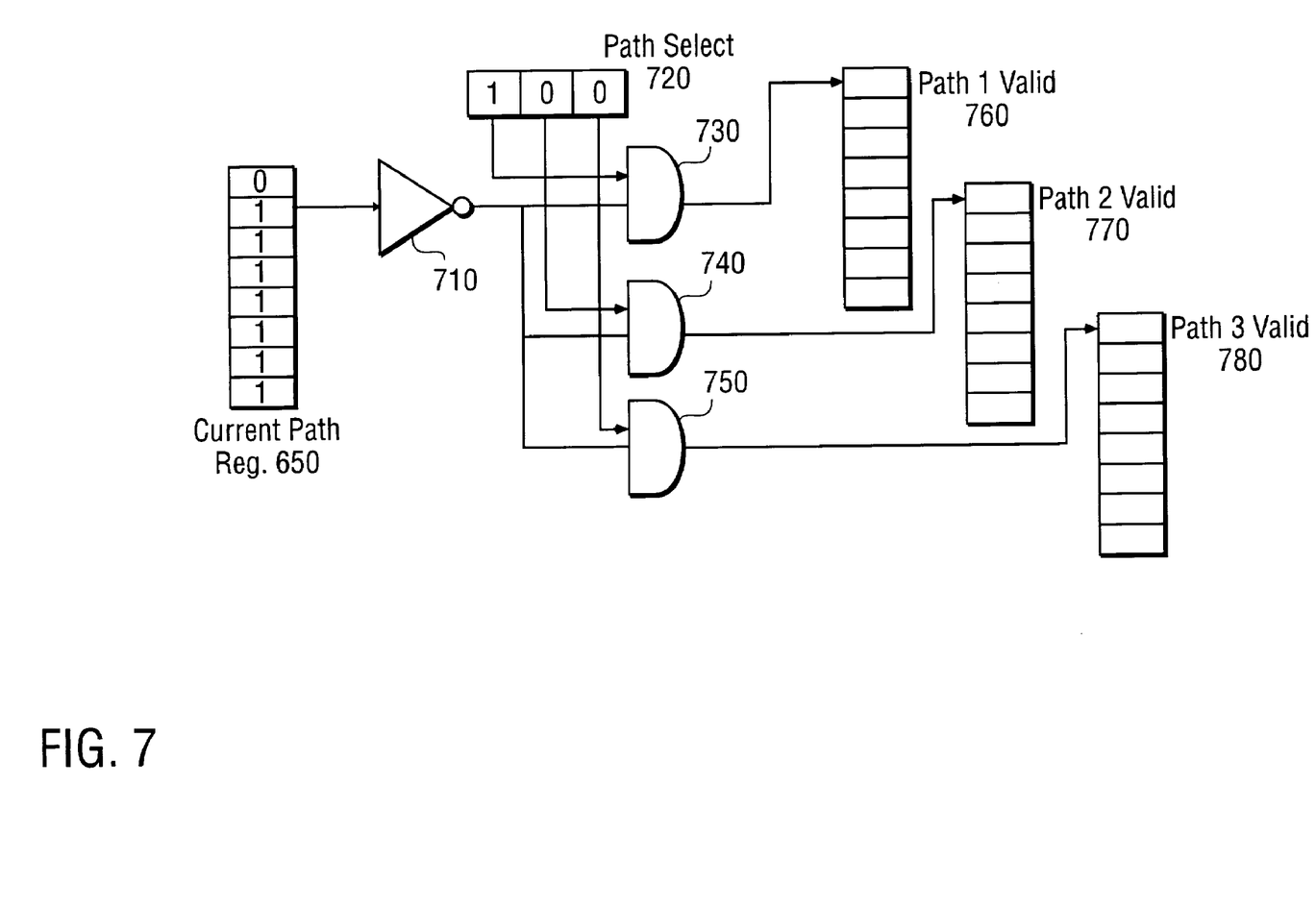
FIG. 7 illustrates an embodiment of an apparatus for steering small packets.

Having determined where the data should be sent, the data must then be transferred. FIG. 7 illustrates an embodiment of an apparatus for steering small packets. Note that this is exemplary, in that it may be replicated for each of path registers 650, 680 and 690, or the path registers 650, 680 and 690 may be multiplexed into the position illustrated by current path register 650. Current path register 650 has each bit fed provided, either serially to a single inverter 710 or in parallel to a set of inverters. The output of inverter 710 is provided to and gates 730, 740 and 750, along with each of three values from path select register 720. The bit with a '1' value of path select register 720 determines which path is properly the current path (due to a least recently used theory for example), thereby determining which path will receive the byte corresponding to the bit of current path register 650. Once all of the bits of current path register 650 have been exhausted, in one embodiment, next path register 680, and then next-to-next path register 690 may be multiplexed in for transfer purposes. Alternatively, three path select registers may be maintained, with one indicating a current path, one a next path and one a next-to-next path.

Moreover, in one embodiment, the output of and gates 730, 740 and 750 is used as a flag, which is stored in path 1 valid register 760, path 2 valid register 770 and path 3 valid register 780, each of which are then used to enable or disable (through masking for example), copying of the data initially received to the appropriate data path. Alternatively, the outputs of and gates 730, 740 and 750 are used as the actual enable signals for the copying just described, with each of registers 760, 770 and 780 containing the valid data for the path in question.

Figure 8:
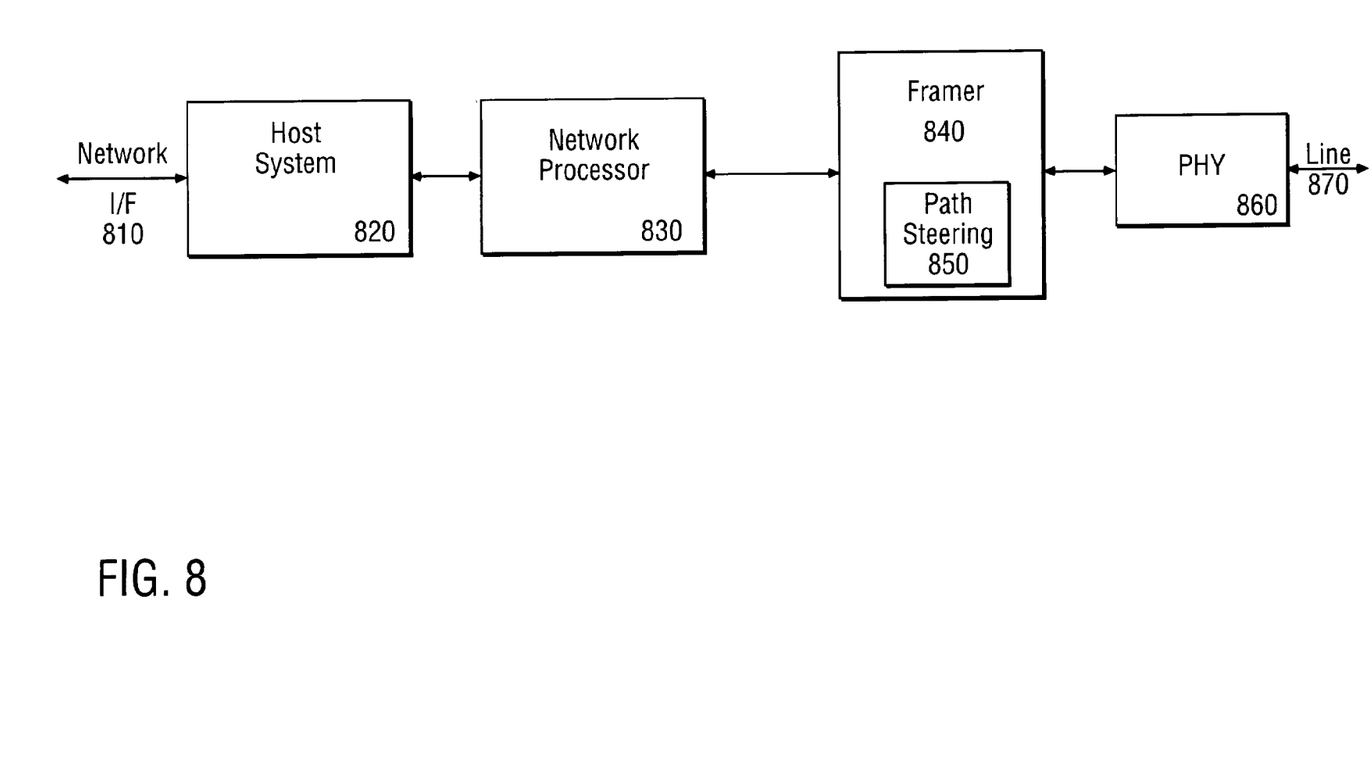
FIG. 8 illustrates an embodiment of a system in block diagram form in which packets may be handled.

The previously described apparatuses and methods may be used in various systems. FIG. 8 illustrates an embodiment of a system in block diagram form in which packets may be handled. Data is received and sent on line 870, which may be a fiber optic cable for example. Coupled to line 870 is physical layer 860, which translates signals from line 870 into a form suitable for use by circuitry, such as through optoelectronic transformation. Coupled to physical layer 860 is framer 840, which operates to frame or deframe data for transmission or reception, and includes path steering logic 850. Path steering logic 850 may be implemented using the embodiments described with respect to FIGS. 6 and 7 for example, or through use of other embodiments. Coupled to framer 840 is network processor 830, which may be used to process data for transmission or reception. Coupled to network processor 830 is host system 820, which may transfer data between network processor 830 and a network interface 810 which couples to an internal network. Thus, the system of FIG. 8 may be connected to a line such as line 870, and then path steering logic 850 may be used to steer data into one of several paths after that data is received on line 870.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIGS. 6 and 7 may be integrated into components, or may be subdivided into components. Similarly, the blocks of FIG. 4B (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method comprising:
   receiving data packets;
   comparing bytes with an expected value to locate a transition from a current packet to a next packet;
   steering data to a first path when a first result of the comparing indicates the data is part of the current packet; and
   steering data to an other path when a second result of the comparing indicates the data is part of the next packet, wherein the first path and the other path are alternately used for a subsequent data packet received.

2. The method of claim 1, further comprising:
steering data of the other path to a third path based on a third result of the comparing.

3. The method of claim 2, further comprising:
steering data of the other path to a second path based on the second result of the comparing.

4. The method of claim 3, further comprising:
setting flags of a set of storage locations, each storage location holding one of the first result, the second result, or the third result.

5. The method of claim 1, wherein comparing bytes with an expected value comprises:
checking if a first byte has the value 0x7E;
checking if a previous byte has the value 0x7E;
treating all bytes following 0x7E as 0x7E for the first path;
treating all bytes preceding 0x7E as 0x7E for the other path; and
checking if all bytes from the current data packet have been checked.

6. An apparatus, comprising:
comparison logic to compare received data values to an expected data value to locate a transition from a current packet to a next packet, producing a first result;
combinatorial logic coupled to the comparison logic, the combinatorial logic to use the first result to encode in a second result which path of a set of paths the received data should traverse based on whether the data is part of the current packet or the next packet; and
transfer logic coupled to the combinatorial logic, the transfer logic to transfer the received data values to each of three paths using the second result, wherein each of the three paths are alternatingly used for a subsequent received data packet.

7. The apparatus of claim 6, further comprising:
a set of flags coupled to the comparison logic and to the combinatorial logic, the set of flags to store the first result.

8. The apparatus of claim 6, further comprising:
a register coupled to the comparison logic and to the combinatorial logic, the register to store the first result.

9. The apparatus of claim 8, further comprising:
a first path register coupled to the combinatorial logic and the transfer logic, the first path register to hold the second result for the first path.

10. The apparatus of claim 9, further comprising:
a second path register coupled to the combinatorial logic and the transfer logic, the second path register to hold the second result for the second path.

11. The apparatus of claim 10, further comprising:
a third path register coupled to the combinatorial logic and the transfer logic, the third path register to hold the second result for the third path.

12. The apparatus of claim 11, wherein:
the transfer logic including a path select register to store a status of which path of the set of paths is the first path.

13. The apparatus of claim 12, further comprising:
a data register coupled to the comparison logic and the transfer logic, the data register to store the received data values.

14. The apparatus of claim 6, wherein:
a framer includes each of the comparison logic, transfer logic and combinatorial logic.

15. The apparatus of claim 14, further comprising:
a physical link layer coupled to the framer.

16. The apparatus of claim 15, further comprising:
a network processor coupled to the framer.

17. The apparatus of claim 16, further comprising:
a host system coupled to the network processor.

18. An apparatus, comprising:
means for receiving data packets;
means for comparing data bytes with an expected value to locate a transition from a current packet to a next packet;
means for steering data bytes to a first path when a first result of the means for comparing indicates the data is part of the current packet; and
means for steering data bytes to an other path when a second result of the means for comparing indicates the data is part of the next packet, wherein the first path and the other path are alternately used for a subsequent data packet received.

19. The apparatus of claim 18, further comprising:
means for steering data bytes of the other path to a third path based on a third result of the means for comparing.

20. The apparatus of claim 19, further comprising:
means for setting flags of a set of storage locations, each storage location holding one of the first result, the second result, or the third result.

\* \* \* \* \*